United States Patent
Bechel

(10) Patent No.: US 11,963,522 B2
(45) Date of Patent: Apr. 23, 2024

(54) FISHING LURE FOR GAME FISH

(71) Applicant: Nathan James Bechel, Eagle Lake, MN (US)

(72) Inventor: Nathan James Bechel, Eagle Lake, MN (US)

( * ) Notice: Subject to any disclaimer, the term of this patent is extended or adjusted under 35 U.S.C. 154(b) by 474 days.

(21) Appl. No.: 15/097,638

(22) Filed: Apr. 13, 2016

(65) Prior Publication Data
US 2016/0330947 A1 Nov. 17, 2016

Related U.S. Application Data

(60) Provisional application No. 62/161,633, filed on May 14, 2015.

(51) Int. Cl.
*A01K 85/00* (2006.01)

(52) U.S. Cl.
CPC .................. *A01K 85/1831* (2022.02)

(58) Field of Classification Search
CPC .............. A01K 85/00–18; A01K 85/08; A01K 85/1831; A01K 85/1837
USPC .......................................................... 43/4.5
See application file for complete search history.

(56) References Cited

U.S. PATENT DOCUMENTS

| | | | |
|---|---|---|---|
| 994,927 A * | 6/1911 | Jefferson | A01K 85/02 43/42.1 |
| 2,250,478 A * | 7/1941 | Franks | A01K 85/16 43/42.3 |
| 2,396,734 A | 3/1946 | Williams, Jr. | |
| 2,825,174 A * | 3/1958 | Leinonen | A01K 83/06 43/44.8 |
| 3,296,734 A | 1/1967 | Johnson | |
| 3,604,140 A | 9/1971 | Nelson | |
| 3,890,736 A * | 6/1975 | Worden | A01K 85/00 43/42.11 |
| 3,918,192 A | 11/1975 | Rabideau | |
| 3,943,651 A * | 3/1976 | Erving | A01K 85/10 43/42.19 |
| 3,996,688 A * | 12/1976 | Hardwicke, III | A01K 85/00 43/42.09 |
| 4,464,857 A | 8/1984 | Olszewski | |
| 4,745,699 A | 5/1988 | Gage | |
| 4,791,749 A | 12/1988 | Stazo | |
| 4,891,901 A * | 1/1990 | Baker, Jr. | A01K 85/00 43/42.11 |
| 4,944,112 A | 7/1990 | Garmany et al. | |
| 4,947,574 A | 8/1990 | Tapley | |
| 4,998,373 A * | 3/1991 | Braswell | A01K 85/00 43/42.37 |
| 5,090,151 A | 2/1992 | Salminen | |

(Continued)

*Primary Examiner* — Magdalena Topolski
(74) *Attorney, Agent, or Firm* — Westman, Champlin & Koehler, P.A.; Amanda M. Prose

(57) ABSTRACT

A multi-hook fishing lure for use with soft bait comprising two or more hooks positioned on the same end of a lure body. The hooks comprise a single point and a double point hook. The single point hook is integrally formed with the lure body and lure wire. The double point hook is secured to the lure body by connection with an eyelet formed on a terminal end of the lure wire. The opposing end of the lure wire on the opposite end of the lure body is configured with an eyelet for attaching to a fishing line. Soft bait is secured to both the single and double point hooks for a secure, compact connection allowing the soft bait to flow and move providing the appearance of live bait.

12 Claims, 5 Drawing Sheets

(56) References Cited

U.S. PATENT DOCUMENTS

| | | | |
|---|---|---|---|
| 5,119,581 A * | 6/1992 | Rudolph | A01K 85/16 43/42.22 |
| 5,299,379 A | 4/1994 | Hawk | |
| 5,505,015 A | 4/1996 | Delricco | |
| 5,600,916 A | 2/1997 | Smith | |
| 5,628,139 A * | 5/1997 | Rhoten | A01K 85/12 43/42.38 |
| 5,647,163 A * | 7/1997 | Gorney | A01K 85/00 43/42.32 |
| 5,649,384 A * | 7/1997 | Manning | A01K 85/00 43/42.37 |
| 5,890,317 A | 4/1999 | Hollomon | |
| 5,926,993 A | 7/1999 | Marusak et al. | |
| 5,983,554 A * | 11/1999 | Storey | A01K 85/02 43/42.42 |
| 6,082,039 A | 7/2000 | McGuinness | |
| 6,141,900 A | 11/2000 | Rudolph | |
| 6,219,956 B1 * | 4/2001 | Hurt | A01K 83/06 43/42.09 |
| 6,301,823 B1 | 10/2001 | Monticello | |
| 6,772,552 B2 | 8/2004 | Parrish | |
| 6,931,785 B1 | 8/2005 | Johnson | |
| 6,941,696 B2 | 9/2005 | Kato | |
| 7,010,881 B2 | 3/2006 | Altman | |
| 7,469,497 B2 | 12/2008 | Hergott | |
| 7,493,725 B2 * | 2/2009 | Sampson | A01K 85/16 43/42.24 |
| 8,020,339 B1 | 9/2011 | Carter | |
| 8,186,096 B2 * | 5/2012 | Rubin | A01K 91/04 43/42.39 |
| 8,259,782 B2 | 9/2012 | Wu et al. | |
| 8,347,547 B1 | 1/2013 | Houdek | |
| 8,359,782 B1 | 1/2013 | Alzamora et al. | |
| 8,769,862 B2 | 7/2014 | Blanchar | |
| 8,793,925 B2 | 8/2014 | Rossi | |
| 9,149,027 B2 * | 10/2015 | Hyndman | A01K 83/00 |
| 2002/0124455 A1 | 9/2002 | Bauman | |
| 2004/0216358 A1 | 11/2004 | Brandt | |
| 2006/0037232 A1 * | 2/2006 | Gill | A01K 83/06 43/42.39 |
| 2006/0162232 A1 | 7/2006 | Allen | |
| 2006/0196105 A1 | 9/2006 | Michlitsch | |
| 2006/0254119 A1 | 11/2006 | Siirtola et al. | |
| 2006/0260180 A1 | 11/2006 | Hong | |
| 2008/0202013 A1 | 8/2008 | Moffitt | |
| 2009/0119972 A1 | 5/2009 | Reilly | |
| 2009/0202016 A1 | 8/2009 | Seong et al. | |
| 2009/0288330 A1 | 11/2009 | Finley | |
| 2010/0180488 A1 | 7/2010 | Keeton et al. | |
| 2011/0239523 A1 | 10/2011 | Baskett | |
| 2012/0023804 A1 | 2/2012 | Hogan | |
| 2012/0036760 A1 | 2/2012 | Scarpace, Jr. | |
| 2012/0055071 A1 | 3/2012 | Westin | |
| 2012/0285072 A1 | 11/2012 | Rosko | |
| 2013/0019517 A1 | 1/2013 | Lorentz | |
| 2014/0190064 A1 | 7/2014 | Fellbaum | |
| 2015/0020432 A1 * | 1/2015 | Dages | A01K 85/00 43/42.39 |

* cited by examiner

FISHING LURE FOR GAME FISH

CROSS-REFERENCE TO RELATED APPLICATION

The present application is based on and claims the benefit of U.S. provisional patent application Ser. No. 62/161,633, filed May 14, 2015, the content of which is hereby incorporated by reference in its entirety.

BACKGROUND

The present invention relates to fishing and, more particularly, to a fishing lure for game fish.

A large game fish can shake a hook once it is set or detect artificial characteristics of a lure before the angler has the opportunity to set the hook. Too few hooking points on the lure can also increase the chance the fish has of freeing itself.

The single hook of a V-shaped spinner makes setting the hook and keeping it set a challenge. The V-shape also uses a larger frame, making a missed strike more probable due to a large bait and one hooking point. An in-line spinner typically uses multiple hooks and/or treble hooks to make hookups more likely, but the large amount of metal components often forces the game fish to spit the hook before the angler has the chance to set it.

As can be seen, there is a need for an improved fishing lure for game fish.

SUMMARY

The present disclosure relates to a fishing lure for use with soft bait. The lure comprises a lure head and a lure wire having a length extending from a first end through the lure head and to a second end extending from the base of the lure head. A first hook is mounted such that an end of the hook connects with the base of the lure head and the point of the hook extends away from the base. A second hook is mounted on an end of the lure wire adapted with an eyelet. At least two bends are provided along the length of the lure wire wherein the bends are configured such that the lure is configured to accommodate the first hook, the second hook, and a second eyelet for attaching the lure to a fishing line such that the lure is compact and configured for holding or hooking the soft bait by connection of the soft bait with both the first hook and the second hook.

The first hook and the second hook are different hooks, for example, the first hook may be a single point hook and the second hook may then be a double point hook. Both hooks are positioned to extend from the same end of the lure head, generally referred to as the "base end." The opposing end of the lure wire is configured for connection to a fishing line wherein the connection point may be an eyelet for threading fishing line therethrough. The lure head may also be integrally formed around a length of the lure wire, generally the middle or an end of the lure wire, and with an end length of the first hook. The terminal end of the lure wire proximate the first hook is adapted with an eyelet for connecting the second hook thereto. The multi-hook pattern of the present disclosure is configured to reduce missed attacks by game fish during fishing and providing a more compact lure and bait system. The lure is thus more difficult for game fish to recognize as artificial and serves to more securely hook a fish, reducing the chance the fish will be able to free itself from the lure.

Another aspect of the present disclosure relates to a method of using the lures described herein including attaching the lure to a fishing line suitable for the selected game fish and baiting the multi-hook lure with a soft bait for catching game fish. The method comprises providing a lure comprising a lure head and a lure wire having a length extending from a first end, through the lure head, and to a second end and securing the bait to a first hook mounted and extending from the base of the lure head while also securing the bait to a second hook mounted or connected to the eyelet of an end of the lure wire. The lure wire comprises at least two bends along the length of the lure wire configured for accommodating the first hook, the second hook and the bait secured thereto in a compact manner, including an attachment point or eyelet for connecting the lure to a fishing line.

DETAILED DESCRIPTION

Figure 1:
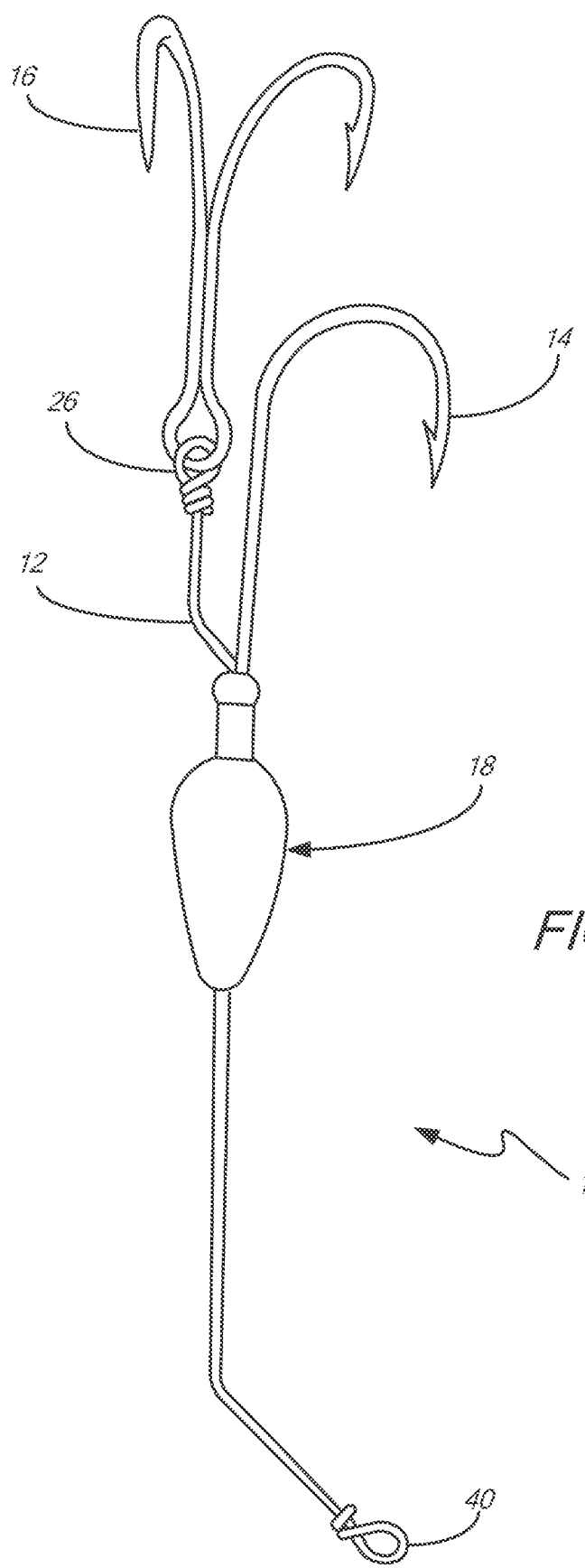
FIG. 1 is a front view of a multi-hook lure for game fishing.
Figure 2:
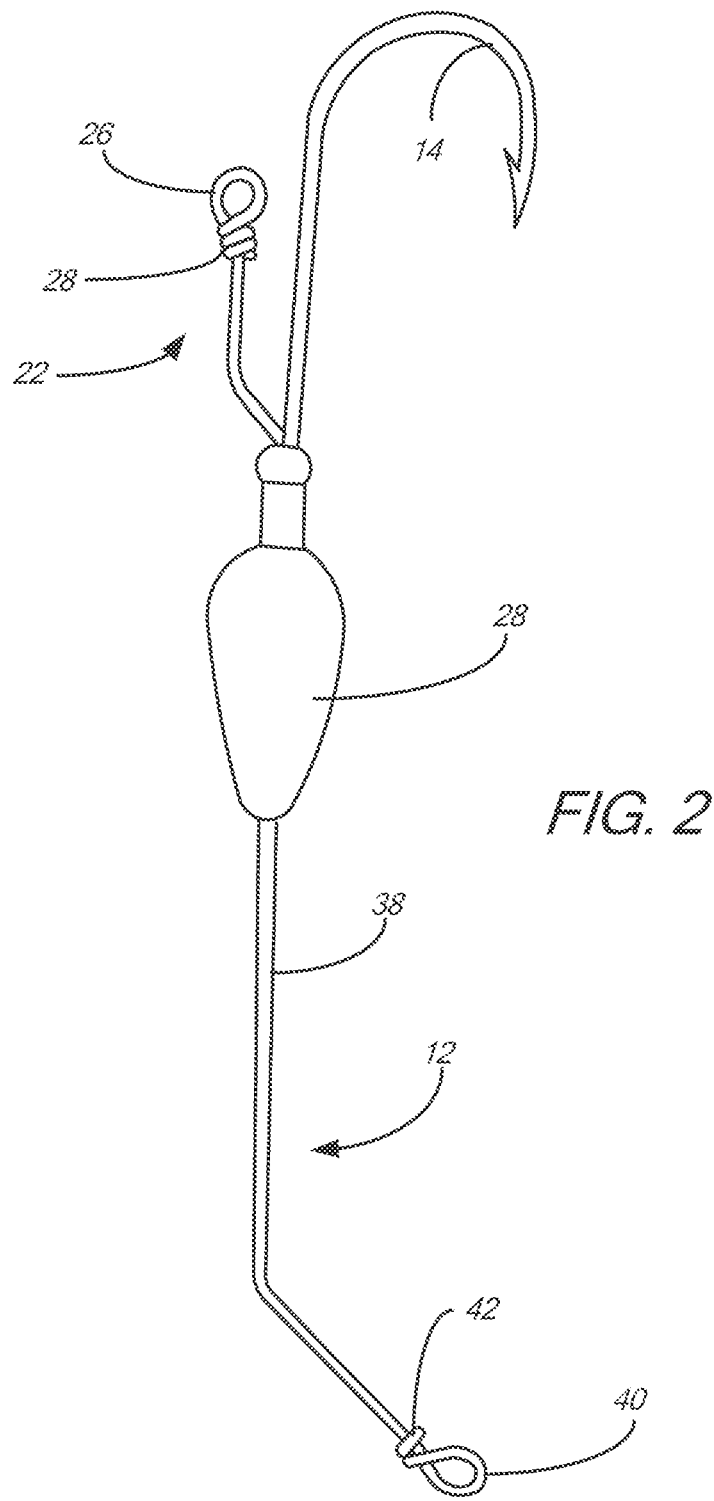
FIG. 2 is a front view of the multi-hook lure prepared for securing a second hook thereto.
Figure 3:
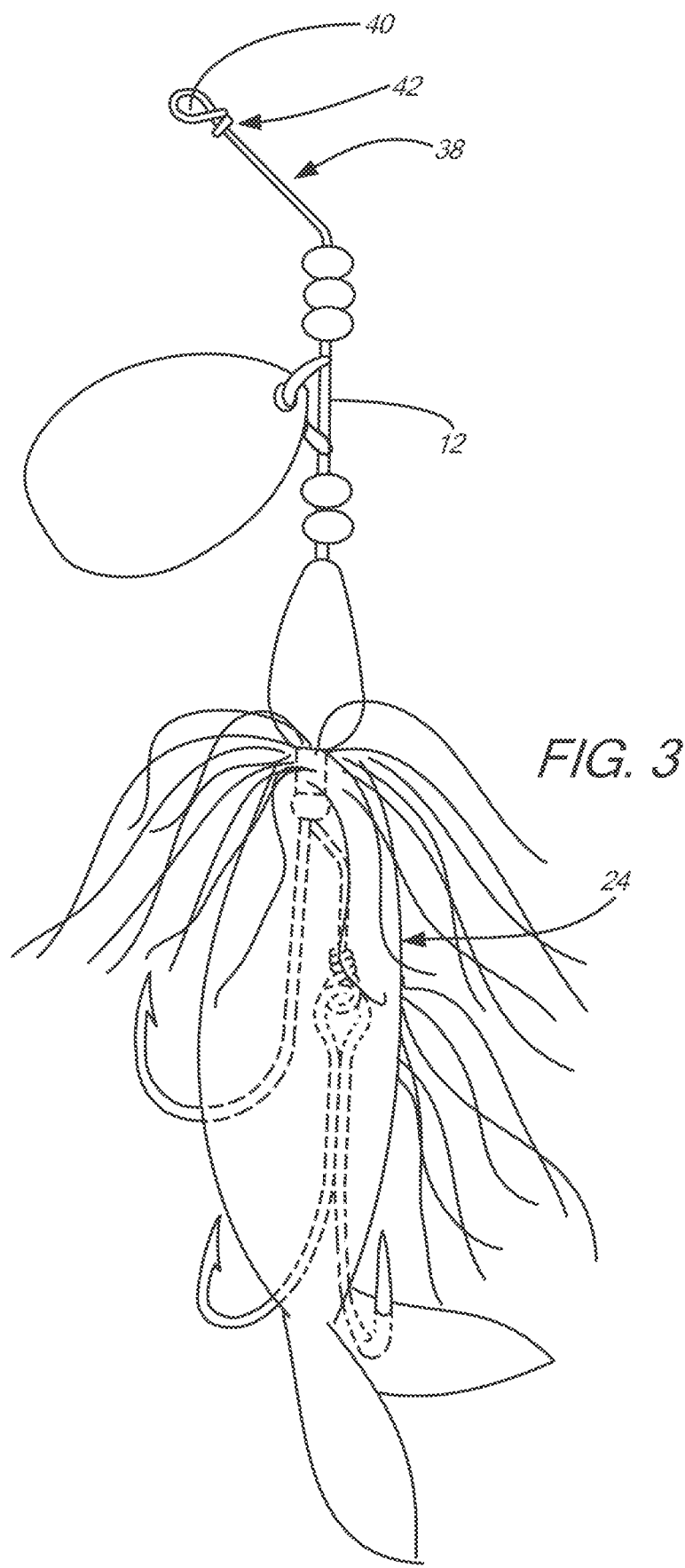
FIG. 3 is a front view of the multi-hook lure having lure bodies and bait secured thereto.

A fishing lure for game fish according to the present disclosure is illustrated generally at 10 in FIGS. 1-4. The lure is relatively compact with a streamlined multi-hook pattern that game fish have a difficult time freeing themselves from once hooked. The multi-hook pattern also makes a missed attack less likely, as the bait is more compact. This streamlined trait also makes the lure more difficult to recognize as artificial and the combination of multiple hooking points makes it increasingly difficult for the fish to free itself from the lure.

The lure of the present disclosure comprises a multi-hook pattern and modified in-line spinner such that the lure is configured for use with any type of bait, for example, a soft bait. The soft bait may be any type of bait, as long as the bait body is able to attach to the hook points of the multi-hook lure. Examples of soft bait include, but are not limited to worms, stick baits, grubs, jerkbaits, swimbaits, craws, lizards, creatures, frogs and toads and/or trailers or any flexible bodied bait such as those comprised of soft plastics, pliable plastics or biodegradable products. The lure may also be used with any alternative bait, including but not limited to natural or organic bait materials. The lure is configured such that when the lure is baited, the lure and bait cohesively make a compact and realistic lure body. The lure reduces misses (e.g., where a fish goes for the bait but escapes being hooked) and allows the angler to set the hooks and keep the hooks set. The cohesive use of soft bait also hinders the fish from recognizing the lure as artificial.

Referring to FIGS. 1-4, the lure 10 comprises a lure wire 12, a single point hook 14, and a double point hook 16. The lure wire 12 and single point hook 14 may be formed as a single component. For example, the single point hook 14 may be integrally formed on a first end of the lure wire 12. The lure wire 12 and single point hook 14 may be formed by casting from a mold with a suitable casting metal. The resulting lure head 18 may then be painted using powder paint or otherwise marked.

Figure 4:
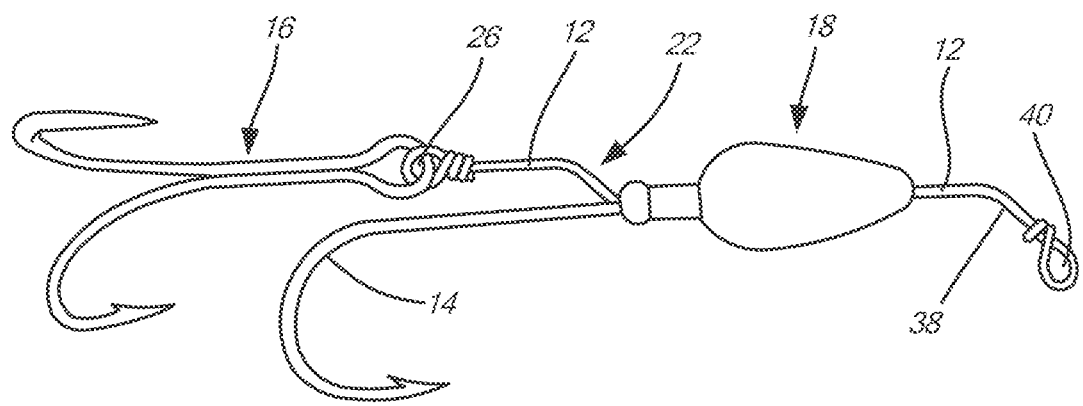
FIG. 4 is a side view of a multi-hook lure for game fishing.

Skirting 20 may be strung up to the base of the lure head 18. A portion 22 of the lure wire 12 protruding from the base of the lure head 18 is then bent, allowing the lure to accommodate bait 24, such as a soft bait, and an eyelet 26 is formed at an end 28 of the portion 22 of the lure wire 12. The double point hook 16 may then be attached to the lure by connection with an eyelet 28 formed in along the distal end 28 of the lure wire 12. As illustrated in FIG. 4, additional skirting 20 may be strung onto the bent lure wire 12. The skirting 20 may then be strung down onto the double point hook 16. Lure bodies, beads, a clevis and/or a spinning blade may then be strung on an opposite end 38 of the lure wire 12. Alternatively, a "clip n spin" type clevis may be threaded on to the wire without a blade. The blade may then be slipped on and off a length of wire attached to the clip n spin clevis. In the embodiment illustrated in FIG. 4, for example, two lure bodies, four beads, a clevis and a spinning blade are secured to the lure. It is also contemplated that the beads and/or clevis may be omitted from the lure and the length of the wire terminating in the eyelet 26 may then be shortened, providing a more compact lure and a lure configured for use with smaller or more compact baits.

A second eyelet 40 is then formed at the terminal end of the opposite end 38 of the lure wire 12 and an end length 42 of the lure wire 12 is bent near the eyelet 40. The end length 42 is bent to an angle, for example, the angle may be approximately a 45 degree angle. The soft bait 24 may then be threaded up the single point hook 14 and hooked in two places by the connection with the double point hook 16.

Figure 5:
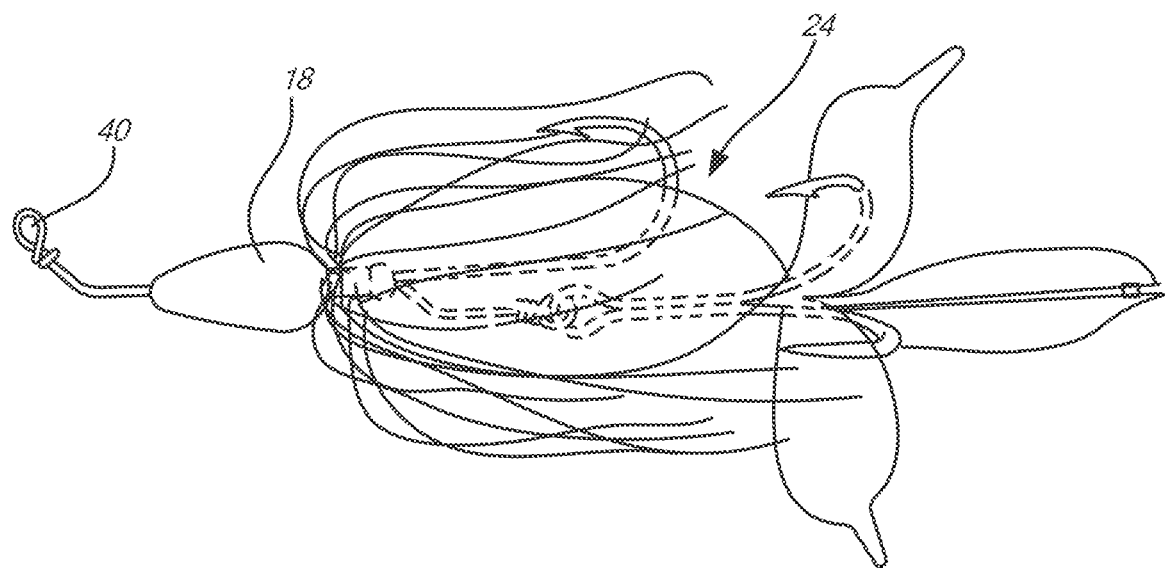
FIG. 5 is a side view of the multi-hook lure having bait secured thereto.
Figure 6:
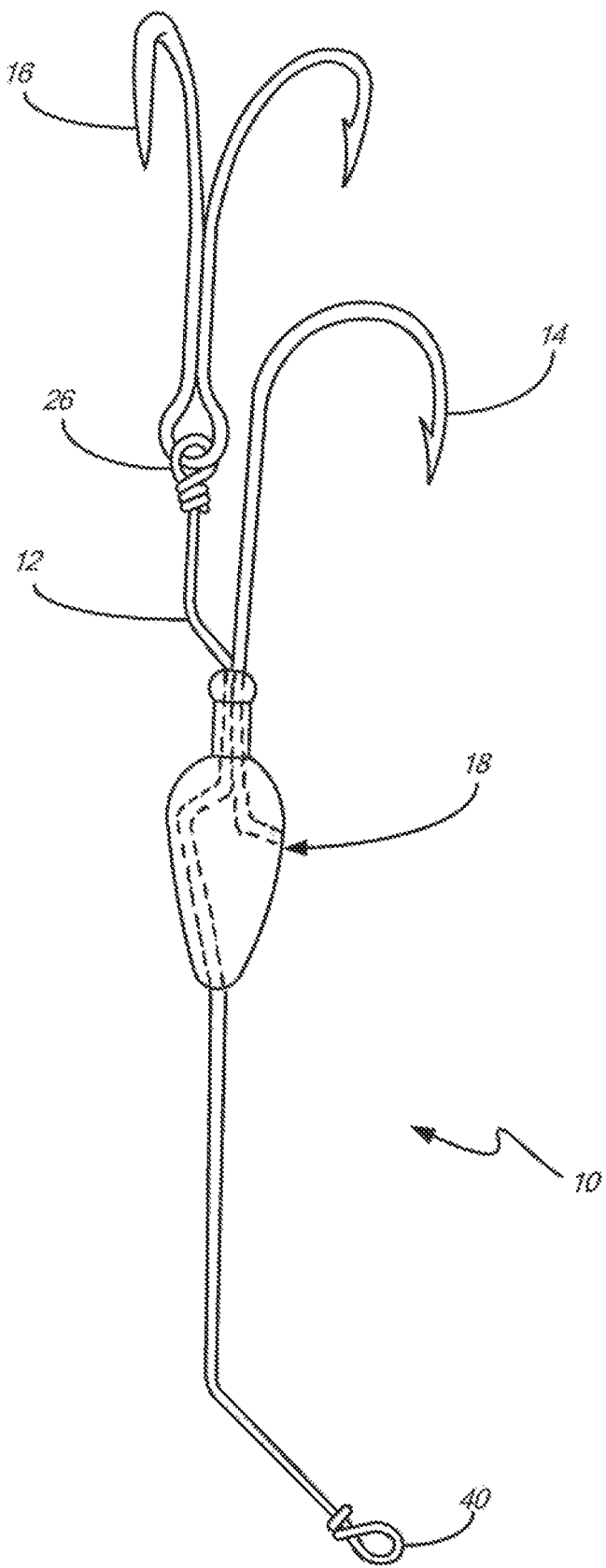
FIG. 6 is a front view of the multi-hook lure for game fishing.

As illustrated in FIGS. 5-6, the lure may comprise a more compact size including a shortened lure wire 12, wherein the lure is formed integrally by molding the lure wire 12 and the first hook 14 and forming the lure head to secure the first hook 14 and the lure wire 12. The lure 12 maintains a bent portion comprising a first bend away from the first hook 14 and a second bend spaced from the first bend and directed towards the first hook 14 such that the bends provide a space between the first hook 14 and the length of the lure wire 12 terminating in the first eyelet 26. The eyelet 26 is configured for connection with the second hook 16 and secured the second hook 16 to the lure. The opposing end of the lure wire 12, on the opposite end of the lure head extends a reduced length and comprises a bend along its length which terminates in the second eyelet 40 which is configured for connecting the compact lure to a fishing line for use. The bends near eyelet 40 are configured to allow the lure to move freely when moving the lure and bait through the water and allow the lure and bait to remain substantially upright or vertical when the fishing line is pulling the lure through the water.

A method of using the lure comprises hooking the bait, for example, a soft bait onto the first and/or second hook and casting the lure into a body of water. For example, the soft bait is hooked on to both the single point hook and the double point hook, such that the bait body is secured to all hook points of the lure. The lure is casted or placed in the water and retrieved by dragging the lure through the water. Upon retrieval, the spinning blade will rotate around its axis, the skirting will flow and pulsate, and the soft bait will flutter as if swimming while the lure is pulled or dragged through the water. Ultimately, this gives the baited lure the appearance of a live creature moving through the water and the lure is tailored to provoke an accurate strike from a game fish and to keep the game fish attached to the lure by means of sharp and barbed hooks until the angler can subdue the game fish.

When forming the lure 10, the lure wire 12 and single point hook 14 are loaded into a casting mold and casting metal is poured into the casting mold. The single point hook 14 protrudes through a base end of the casting mold and the ends of the lure wire 12 are also exposed on both ends of the casting mold. The resulting poured lure head 18 may then be coated with powdered paint, for example, with a powder paint set by application of heat to the painted surface. Skirting 20 may then be strung onto the single point hook 14, over the protruding end of the lure wire 12 and up to the base of the molded lure head 18. The end of the lure wire 12, which protrudes from the hook side of the molded lure head, is bent away from the single point hook at approximately 45 degrees and at a second length is then bent toward the single point hook at approximately 45 degrees. The first eyelet 26 is formed and more skirting may be threaded onto the bent and protruding end of the lure wire 12, which accommodates the double point hook 16. The double point hook is connected, for example, strung through the formed eyelet 26 of the bent end of the lure wire 12. The strung skirting may then be threaded down past the eyelet 26 and onto the double point hook 16.

One or more lure bodies and one or more beads may be threaded onto the protruding end of the lure wire 12 opposite the single point hook 14. A clevis may also be placed in the eye of a spinning blade and then the clevis may be strung on the protruding end of the lure wire 12 opposite of the single point hook 14. Another bead and lure body may also then be threaded onto the protruding end of the lure wire 12 opposite the single point hook 14. The second eyelet 40 is then formed at the end of the protruding end of the lure wire 12 opposite the single point hook 14. The beaded lure wire 12 opposite the single point hook 14 is then bent to approximately a 45 degree angle at a length near the eyelet 40. A soft bait 24 can then be threaded on the single point hook 14 and to the double point hook 16 such that the soft bait 24 is hooked to two points near the back end of the soft bait 24.

Although the present disclosure has been described with reference to preferred embodiments, workers skilled in the art will recognize that changes may be made in form and detail without departing from the spirit and scope of the disclosure.

The invention claimed is:

1. A multi-hook fishing lure for use with soft bait comprising:
   a lure head;
   a lure wire having a length that extends through the lure head such that opposing first and second ends of the lure wire are positioned on opposing sides of the lure head; and
   a first hook having a first end secured within the lure head such that the first hook is positioned on a same side of the lure head as the first end of the lure wire,
   wherein the lure wire and the first hook are both securely positioned in the lure head in a manner to prevent rotational movement of the lure wire and the hook with respect to the lure head, wherein inside the lure head, the lure wire and the first end of the first hook are independent and adjacent to one another, wherein the lure wire comprises a plurality of bends along the length extending through the lure head allowing the first and second opposing ends of the lure wire positioned on opposing sides of the lure head to exit the lure head at linearly aligned locations on the lure head and wherein the plurality of bends secure the lure wire in the lure head and prevent rotation of the lure wire with respect thereto, and
   wherein the first end of the first hook comprises a bend along the first end secured within the lure head to prevent rotation of the first hook with respect thereto, and wherein the first end of the first hook exits the lure head at a same location as the lure wire, wherein the lure wire comprises a first external bend along the first end thereof so as to increase a space between the first hook and the first end of the lure wire which is configured to support a second hook mounted thereon, and wherein the second end of the lure wire comprises a first length extending from a base of the lure head to a second external bend, wherein the first length is parallel with an axis of a length of the lure head and the first length having an accessory secured thereto, and the lure wire comprising a second length extending from the second external bend to an attachment point for mounting the lure to a line, wherein the second length extends away from the lure head and the first length at an angle greater than 90 degrees and wherein the first and second lengths of the lure wire allow the lure and bait to remain substantially upright or vertical when the lure is pulled through water.

2. The lure of claim 1, wherein the first end of the lure wire comprises a second hook, and wherein the first hook and the second hook have a different number of points.

3. The lure of claim 2 wherein the first hook is a single point hook and the second hook is a double point hook.

4. The lure of claim 1, wherein the first end of the lure wire terminates in an eyelet configured for securing the second hook to the lure.

5. The lure of claim 1, wherein the second end of the lure wire terminates in an eyelet configured for securing the lure to a line.

6. The lure of claim 1, wherein at least two bends of the plurality of bends along the length extending through the lure head are spaced apart along the length of the lure wire within the lure head and wherein each of the at least two bends are approximately 45 degree bends.

7. The lure of claim 1, wherein the accessory secured to the first length of the second end of the lure wire is a spinner, clevis, bead or combination thereof.

8. A method of baiting a multi-hook fishing lure for use with soft bait comprising:

providing a lure comprising a lure wire having a total length extending from a first end through a lure head to a second end where a length of the first end and a length of the second end are external to the lure head;

securing the bait to a first hook spaced apart from the lure wire and extending from secure attachment of a first end of the first hook within the lure head wherein the first hook is independent of and adjacent to the lure wire inside the lure head and wherein the first hook exits the lure head at a same location as the lure wire, the first hook having a bend along its length inside the lure head to prevent rotation of the first hook with respect to the lure head;

securing the bait to a second hook attached to the first end of the lure wire, wherein the lure wire has a plurality of bends along the total length of the lure wire comprising a first plurality of bends along the length extending through the lure head allowing the first and second opposing ends of the lure wire positioned on opposing sides of the lure head to exit the lure head at linearly aligned locations on the lure head and wherein the plurality of bends secure the lure wire in the lure head and prevent rotation of the lure wire with respect thereto; and providing an attachment point on the second end of the lure wire for using the lure, wherein the second end of the lure wire comprises a first length extending from a base of the lure head to a second external bend, wherein the first length is parallel with an axis of a length of the lure head, and the lure wire comprising a second length extending from the second external bend to the attachment point, wherein the second length extends away from the lure head and the first length at an angle greater than 90 degrees, and wherein the first and second lengths of the lure wire allow the lure and bait to remain substantially upright or vertical when the lure is pulled through water.

9. The method of claim 8, wherein securing the bait to the first and second hooks comprises hooking the bait wherein the first hook and the second hook have a different number of points.

10. The method of claim 8, wherein the first hook is a single point hook and the second hook is a double point hook.

11. The method of claim 8, and further providing a first eyelet configured for securing the second hook to the lure wire at the first end of the lure wire.

12. The method of claim 11 and providing the first hook and the second hook both extending from a base end of the lure head by attaching the second hook to the first eyelet.

\* \* \* \* \*